W. SUDEKUM.
METALLIC PACKING.
APPLICATION FILED SEPT. 20, 1920.
1,366,219.
Patented Jan. 18, 1921.
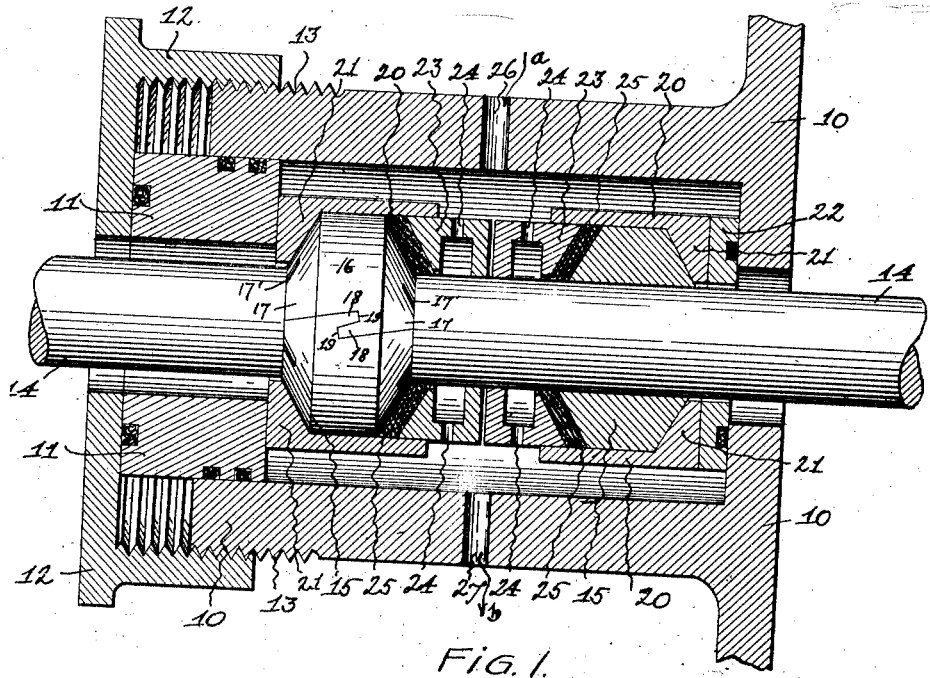
FIG. 1.
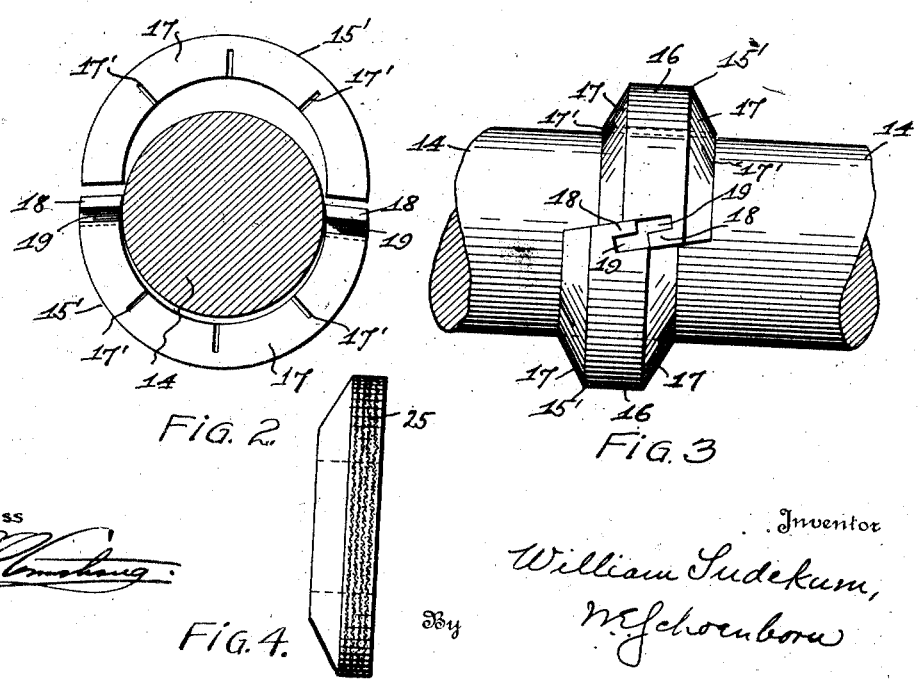
FIG. 2.   FIG. 3.
FIG. 4.
Witness
Inventor
William Sudekum,
By W. Schoenborn
Attorney

UNITED STATES PATENT OFFICE.

WILLIAM SUDEKUM, OF NASHVILLE, TENNESSEE.

METALLIC PACKING.

366,219.   Specification of Letters Patent.   Patented Jan. 18, 1921.

Application filed September 20, 1920. Serial No. 411,543.

*To all whom it may concern:*

Be it known that I, WILLIAM SUDEKUM, a citizen of the United States, residing at Nashville, in the county of Davidson and State of Tennessee, have invented certain new and useful Improvements in Metallic Packings, of which the following is a specification.

This invention relates to packings, and more particularly to that class of packings described in my former patents numbered 1,074,773 and 1,118,315, respectively, and which are designed more especially for packing the piston rods and valve stems of ammonia or other gas compressors, high pressure engines and pumps, and other like apparatus, the purpose being to provide improvements in the constructions of such packings which will prevent any fluid or gas under pressure to escape around such rods or stems, so that high pressure and superheated fluids may be used not only without loss but also at a higher efficiency.

One principal object of the invention is to provide such an improved construction as to enable the packing to be continuously used without being required to entirely dismantle the same as certain parts wear or seat themselves to the reciprocating rod or stem and other parts may be inserted to take up the wear or reduction in size of the packing parts.

A second principal object is to provide an improved packing in which the divided packing parts are so constructed, whereby one part or section is capable of being supported or sustained on the rod without being constantly gripped by the hand while the other half is being adjusted, so that the several parts of the packing can be readily and easily adjusted and arranged while being assembled.

A third object of the invention is to provide an inclosed packing to be kept constantly bathed in a suitable lubricant, the lubricant flowing through the inclosing casing, so that the packing is kept cool, if so desired.

With the above and other objects in view, as will be hereinafter apparent from the detailed disclosure, the invention consists in general of certain novel details of construction and combination of parts to be hereinafter more fully described and particularly pointed out in the appended claims.

In the accompanying drawings, like reference characters indicate like parts in the several views, and Figure 1, is a longitudinal vertical section of the packing;

Fig. 2, is an end view showing the manner of assembling one of the elements comprising the packing; and Fig. 3, is a side view of said elements shown in Fig. 2, in the act of being locked in position about the piston rod.

Fig. 4 is an enlarged side elevation of the improved fibrous ring used in connection with the packing.

Referring to the drawings, 10 is the stuffing box provided with a front follower or ring 11 which is adapted to be adjusted by means of an internally threaded screw cap 12, engaging the threads 13 on the exterior of box 10, as shown. Through this box 10 passes a piston rod or valve stem 14 whereon are mounted divided metallic packing rings 15, 15, each of which rings consists of two semi-annular parts 15', 15' (see Figs. 2 and 3) and when assembled and locked around the piston rod 14 form a central annular section 16 and two end sections 17 and 17 preferably in the form of oppositely disposed frustums of a cone, which are provided with radial slits or slots 17', 17', cut therein to permit these sections of the rings to more readily conform to the curvature of rod 14, as will be readily understood. Said semi-annular parts 15' and 15' of the packing rings 15 are provided at their ends with interengaging projections 18, 18, and slots 19, 19, so disposed and proportioned, so that when said parts 15', 15', are pressed together and along the rod 14, (see Fig. 3), said projections and slots will engage each other and the parts 15', 15', be locked together on the rod 14, as shown in Fig. 1. Another and most important feature of construction of said parts 15' and 15' is that the ends or outer extremities of the inner curved surface of the projections 18, 18, are a slight distance beyond a medial line passing through the center of the piston rod 14, so that when one of the parts 15' is pressed down on said rod 14 in a plane normal to the axis of the rod 14, said semi-annular part 15' will snap, so to speak on the rod 14, for the reason that the distance between the outer section of the inner sides or ends of the projections 18, 18, of each part 15' is slightly shorter than the diameter of the rod 14, and hence after being sprung or snapped, on the rod 14 as just described and released, said part 15' will be suspended or supported from said rod 14, as shown in Fig. 2, and enables one to have the use of two hands to assemble or make adjustments of the other elements of the packing. Within the box 10 and loosely surrounding the rod 14 are shells 20, 20, each of which is formed at one end with an inwardly directed flange 21 beveled to fit one of the inclined surfaces of the outer conical surface 17 of the packing rings 15, the ring or follower 11 bearing against the outer side of the flange 21, while the flange 21 of the inner shell 20 is seated against a second ring 22, as shown. Within each of said shells 20 is disposed the packing rings 15 and interposed between the separated packings 15, 15, and inserted within the shells 20, 20, and surrounding the rod 14 are two separate and independent hollow cored vibrating glands 23 provided with openings 24, for the purpose of permitting the lubricant to have access to the surface of rod 14, as will be readily understood.

Between the packing rings 15, 15, and adjacent vibrating gland 23 is preferably inserted a fibrous packing 25, for the purpose of permitting the different parts of the packing to have a slight yielding action along the length of the rod 14 during the initial use of the packing and while the parts are being properly seated and find themselves in their correct and tightly fitting relations after slight wear of the packing rings 15, 15. After the packing rings 25, 25, have worn and the cap 12 has been repeatedly screwed down on the threads 13, and to the limit of its movement, said cap 12 can be unscrewed and the ring or follower 11 and outer shell 20 with its packing ring 15 and vibrating gland 23 may be moved along the rod 14 until outside of the box 10 and any suitable number of divided rings or shims are loosely adjusted around the rod 14 and inserted between the separated glands 23, 23, and the removed shell 20 with its packing ring 15 and gland 23 are thrust back into the box and against the inserted rings or shims, when the follower 11 is again properly forced into the bore of the box 10 by means of the cap 12 screwed down on the threads 13 to bring the proper pressure between the several parts of the packing and contact of the packing rings 15, 15, with the rod 14.

The box 10 is provided with an inlet opening 26 and an outlet opening 27 to which the lubricant carrying pipes may be secured, and it will be obvious that such lubricant may be supplied in the direction of the arrows $a$ and $b$ so that all parts may be fully lubricated.

From the foregoing disclosure of the structural characteristics and relative arrangement of the elements comprising the rod packing, it will be seen that if a supply of oil or other form of lubricant is forced through the inlet 26, said lubricant will be properly and uniformly distributed between the contacting surfaces of the producing rings 15 and their overlapping projections 18 and slots 19, vibrating glands 23, shells 20 and rod 14, and said lubricant will finally pass out by the opening 27 to be purified or filtered and be again returned by any suitable pump, not shown, to the inlet 26.

It will also be seen that said shells 20, will have a slight movement transverse to the axis of the piston rod which will permit the packing elements surrounding the rod 14 to have a slight movement as a whole when the rod vibrates during the operation of the engine or pump, and hence any movement of the rod will not affect the efficiency of the packing as the latter will float bodily with the rod and hence provide a constantly tight packing for stuffing boxes and like devices thereby insuring long life and high efficiency for the purpose specified with a minimum of repairs and attention.

The fibrous packing rings 25, 25, are differently constructed and arranged from the usual fibrous packings employed in rod packing in that they are preferably built up of alternate layers of rubber and canvas or textile material and, are set at an angle on the rod substantially at forty-five degrees or thereabouts to the axis of the rod 14, and said packing is so machined and formed with a straight bore and a straight outer edge to accurately and nicely fit about the rod 14, the contiguous walls of the shell 20, metallic ring 15, and gland 23, as clearly shown in Fig. 1, and thereby insure a tight packing under all conditions. With this arrangement of fibrous packing it is only necessary to employ two sets of metallic packing rings and also enables one to use a metallic packing twice the strength in the same packing space.

What I claim is:

1. A rod packing comprising a stuffing box, a reciprocable rod extending through said box, a pair of semi-annular packing rings within said box and surrounding the rod, said rings being divided in a plane parallel to the axis of the rod and having the distance between the ends of their curved surface slightly less than the diameter of the rod, whereby each of said semi-annular packing rings may be snapped over the rod and held thereon without outside support.

2. A rod packing comprising a stuffing box, a reciprocable rod extending through said box, a shell in the box and arranged to loosely surround said rod, a pair of semi-annular packing rings within said shell and surrounding the rod, said rings being divided in a plane parallel to the axis of the rod and having the distance between the ends of their inner curved surface slightly less than the diameter of the rod, whereby each of said semi-annular packing rings may be snapped over the rod and held thereon without outside support.

3. A rod packing comprising a stuffing box, a reciprocable rod extending through said box, a shell in the box and arranged to loosely surround said rod, a pair of semi-annular packing rings within said shell and surrounding the rod and having a slot and projection on each of their free ends for interengagement with each other to unite said rings and secure them about the rod, said rings being divided in a plane parallel to the axis of the rod and having the distance between the ends of their inner curved surface slightly less than the diameter of the rod, whereby each of said semi-annular packing rings may be snapped over the rod and held thereon without outside support.

4. A rod packing including a stuffing box provided with inlet and outlet oil openings and arranged to receive a reciprocable rod, a pair of shells in said box in spaced relation to the side of the box to form an oil chamber between the box and shells and arranged in opposed alinement to loosely receive the rod and capable of transverse movement in the box to permit vibration of said rod, a pair of semi-annular metallic packing rings in each shell, a pair of separable and independent hollow and perforated glands between each pair of packing rings, said glands having their ends adjacent to the packing rings oppositely inclined from center thereof and being also spaced from the inner surface of the box to provide a continuous oil chamber in said box and insertion of spacing rings or shims between said glands, and means to force the shells together and thereby force the set of packing rings as they wear against the rod.

5. A rod packing including a stuffing box provided with an inlet and outlet oil openings, a reciprocable rod extending through said box, a pair of shells in said box in spaced relation to the side of the box to form an oil chamber between the box and shells and arranged in opposed alinement to loosely receive the rod and capable of transverse movement in the box to permit vibration of said rod, a pair of semi-annular metallic packing rings in each shell, a fibrous packing ring in juxtaposition to the metallic packing ring in each shell and surrounding said rod and having opposite side faces at an angle to the axis of the rod and its entire inner circular surface in contact with the rod and its entire outer circular surface parallel with and in contact with the inner surface of the shell, a pair of separable and independent hollow and perforated glands between said fibrous packing rings, said glands having their ends adjacent to the fibrous packing rings oppositely inclined from center thereof and being also spaced from the inner surface of the box to provide a continuous oil chamber in said box and insertion of spacing rings or shims between said glands, and means to force the shells together and thereby force the sets of metallic and fibrous packing rings as they wear against the rod.

In testimony whereof I affix my signature.

WILLIAM SUDEKUM.